June 4, 1929.　　　　C. J. WILSON　　　　1,715,971
CAMPING TRAILER
Filed Sept. 15, 1927　　　4 Sheets-Sheet 1
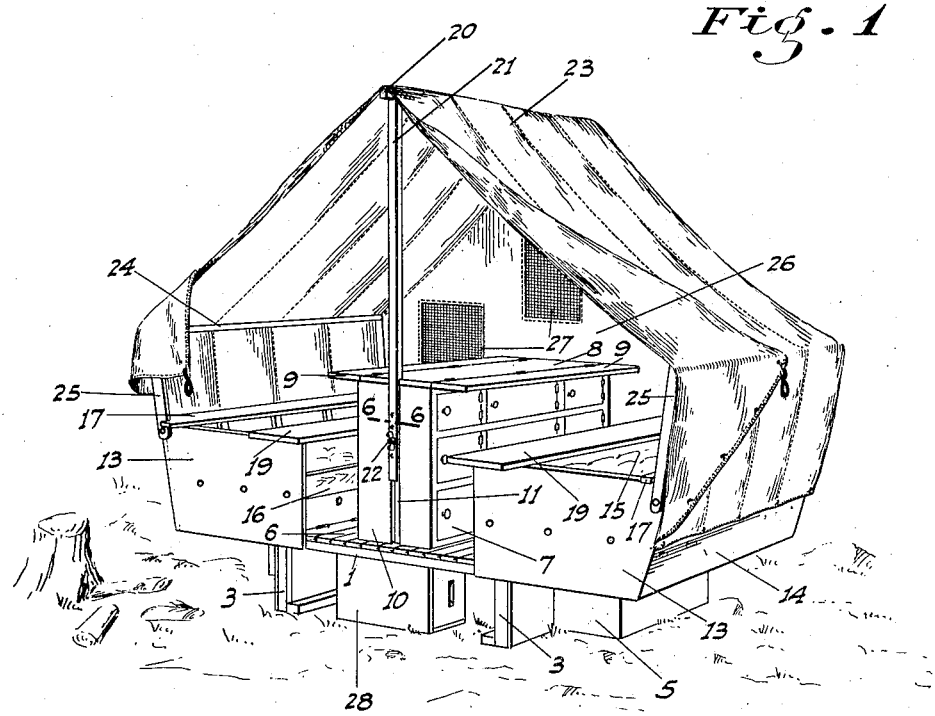
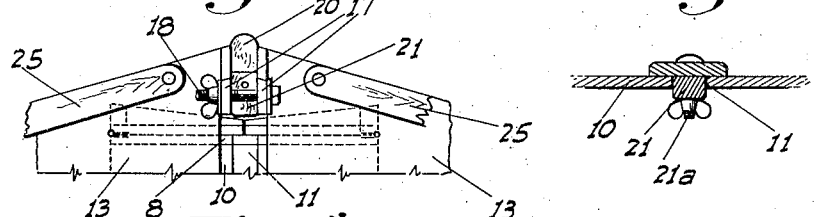
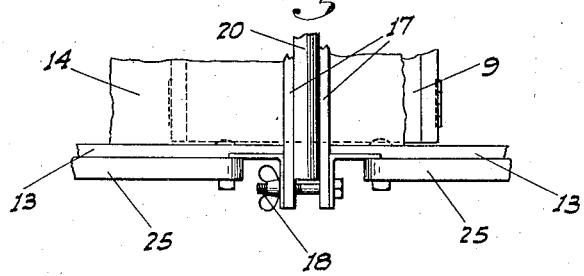
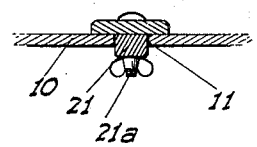
INVENTOR
Chas. J. Wilson
BY
ATTORNEY June 4, 1929.   C. J. WILSON   1,715,971
CAMPING TRAILER
Filed Sept. 15, 1927   4 Sheets-Sheet 2

INVENTOR
Chas. J. Wilson
BY
ATTORNEY

June 4, 1929. C. J. WILSON 1,715,971
CAMPING TRAILER
Filed Sept. 15, 1927  4 Sheets-Sheet 3
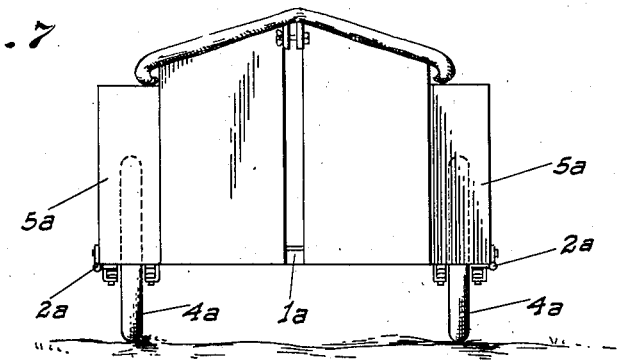
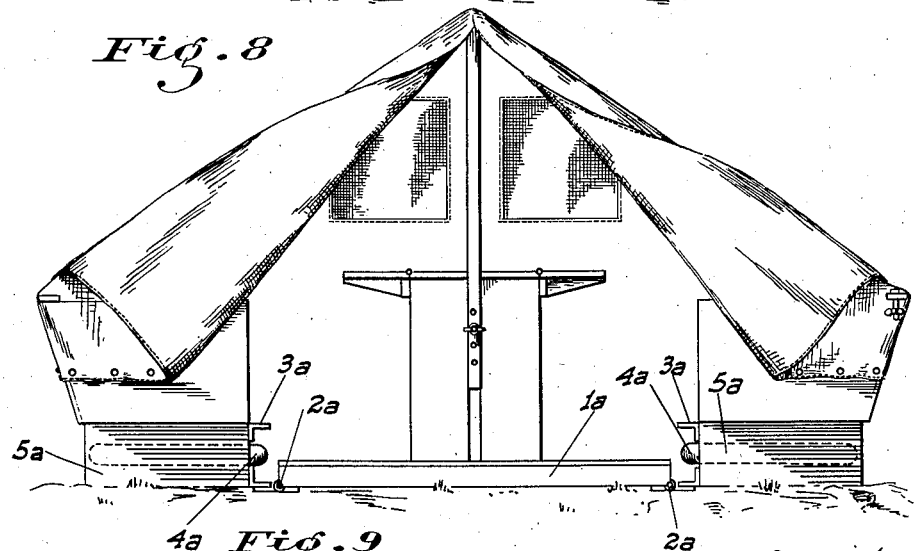
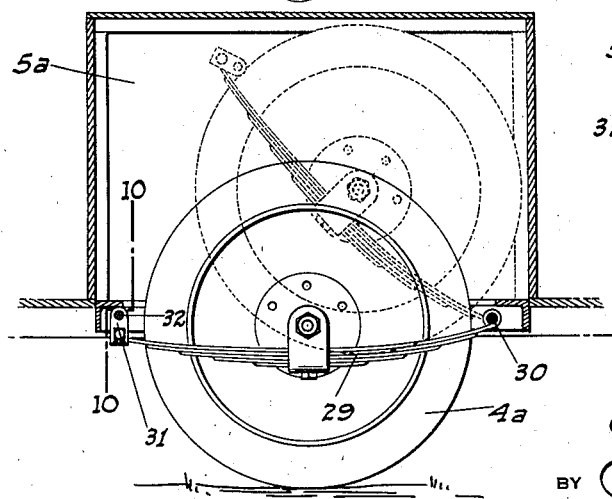
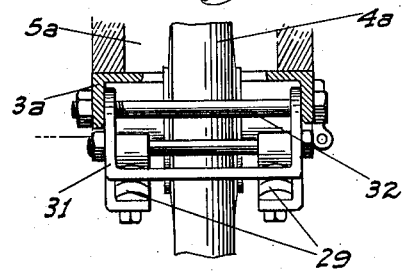
INVENTOR
Chas. J. Wilson
BY
ATTORNEY June 4, 1929.                C. J. WILSON                 1,715,971
                            CAMPING TRAILER
                        Filed Sept. 15, 1927        4 Sheets-Sheet 4
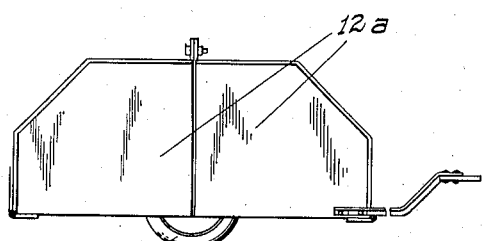
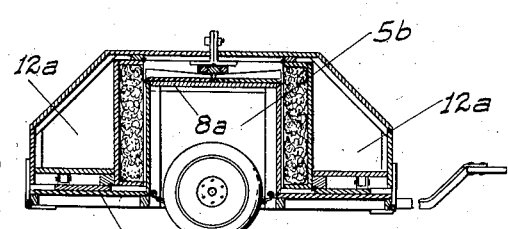
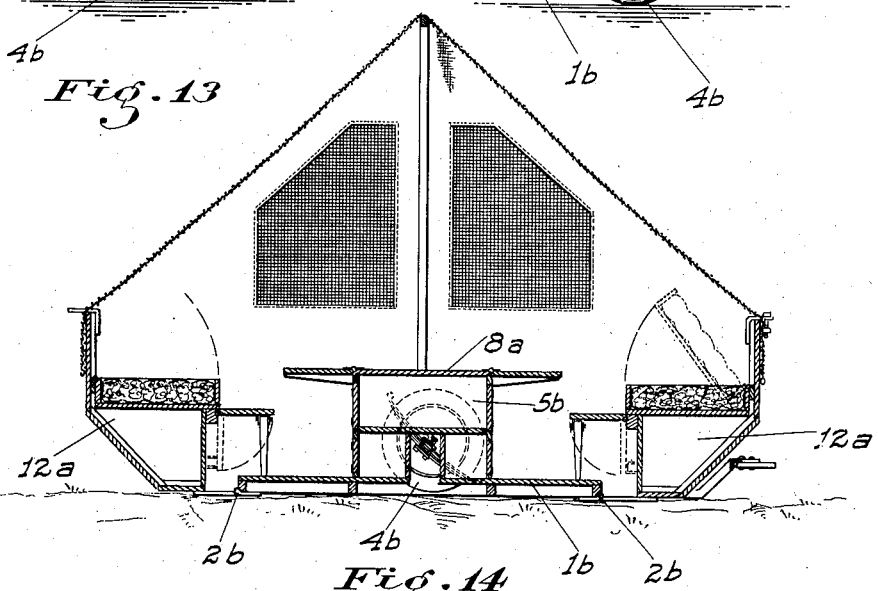
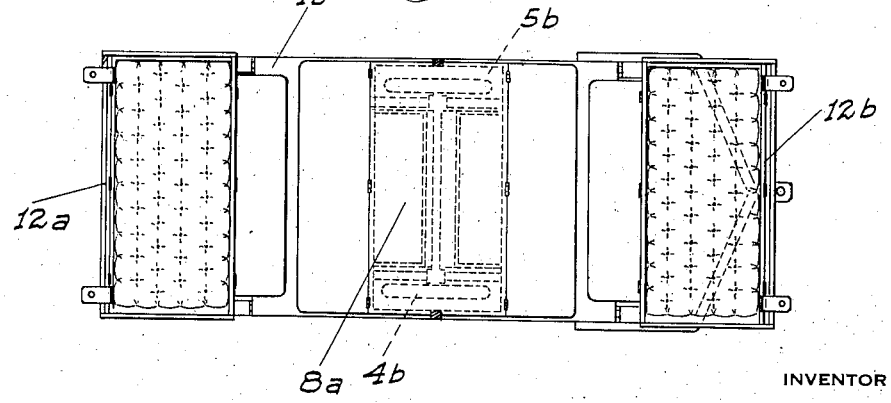
INVENTOR
Chas. J. Wilson
BY
ATTORNEY Patented June 4, 1929.

1,715,971

UNITED STATES PATENT OFFICE.

CHARLES J. WILSON, OF WOODLAKE, CALIFORNIA.

CAMPING TRAILER.

Application filed September 15, 1927. Serial No. 219,571.

This invention relates to improvements in camping trailers of that type arranged to be drawn by automobiles and which carry all necessary camping equipment for the use of the occupants of the vehicle.

The principal object of my invention is to provide a trailer of this general character of a folding and unfolding nature, having bunks, a table, cabinets and the like incorporated therein so arranged that when the trailer is in its folded and traveling position all such camping features and equipment will be enclosed and protected and a neat and compact apparatus is had; and when the trailer is unfolded for camping purposes it will be inherently supported in a rigid and substantial manner and all the interior features will be automatically placed in position ready for immediate use.
A further object of the invention is to provide a trailer structure which may be easily and quickly opened and closed and made ready for use or transportation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:
Fig. 1 is a perspective elevation of my improved camping trailer as opened up and ready for use.

Fig. 4 is an enlarged fragmentary end view of the top central portion of the trailer in its folded position with the canvas covering omitted.

Fig. 5 is a top plan view of this portion of the trailer at one end.

Fig. 6 is a fragmentary sectional plan taken on the line 6—6 of Fig. 1.

Fig. 7 is an end view of a trailer showing a modified arrangement for connecting the wheel trucks with the main frame.

Fig. 8 is a similar view of this trailer opened and ready for use.

Fig. 9 is a longitudinal section of one of the wheel trucks and the wheel housing.

Fig. 10 is an enlarged fragmentary cross section showing a wheel supporting shackle taken on the line 10—10 of Fig. 9.

Fig. 11 is a side elevation of a modified trailer structure, embodying my folding principle, in folded position.

Fig. 12 is a sectional elevation of the folded trailer.

Fig. 13 is a similar view of the trailer, unfolded.

Fig. 14 is a plan view of the unfolded trailer.

Figure 2:
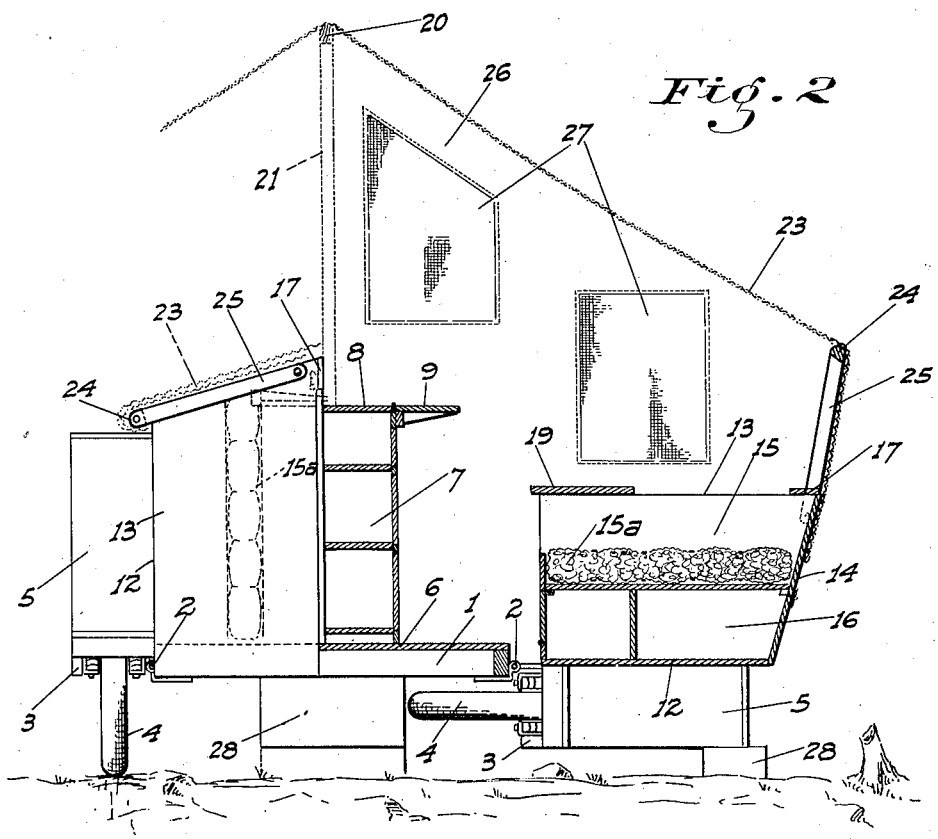
Fig. 2 is an end view of the trailer, one-half being in full and in a closed position, and the other half in section and in its open position.

Referring now more particularly to the characters of reference on the drawings, and particularly at this time to Figs. 1 to 6, the trailer comprises a main horizontal frame 1 of rectangular form and suitable construction and size hinged as at 2, along the outer sides of which are auxiliary frames or wheel trucks 3 supporting ground bearing wheels 4 which are partially enclosed in housings 5 mounted on said auxiliary frames. The frame 1 is covered by a flooring 6 projecting upwardly from which and fixed onto the frame centrally of its width is a cabinet structure 7 of suitable height surmounted by a table 8 along the side edges of which are hinged outwardly opening leaves or extensions 9. The end walls 10 of the cabinet are at the ends of the frame and are formed with vertical slots 11 on their outer faces for a purpose hereinafter seen.

Each frame 3 is provided with a longitudinal side wall 12 extending from end to end thereof and disposed at the inner side of the wheel housing and parallel to the wheel. End walls 13 are secured onto and normally project upwardly from the ends of the side wall 12, and a roof element 14 connects the end and side walls at the top thereof or along the edges farthest from the frame 3. The above set of walls forms an enlosure in which is mounted a bunk 15 disposed parallel to the wheel, and a cabinet or compartments 16 between the bottom of the bunk and the wall 12.

Figure 3:
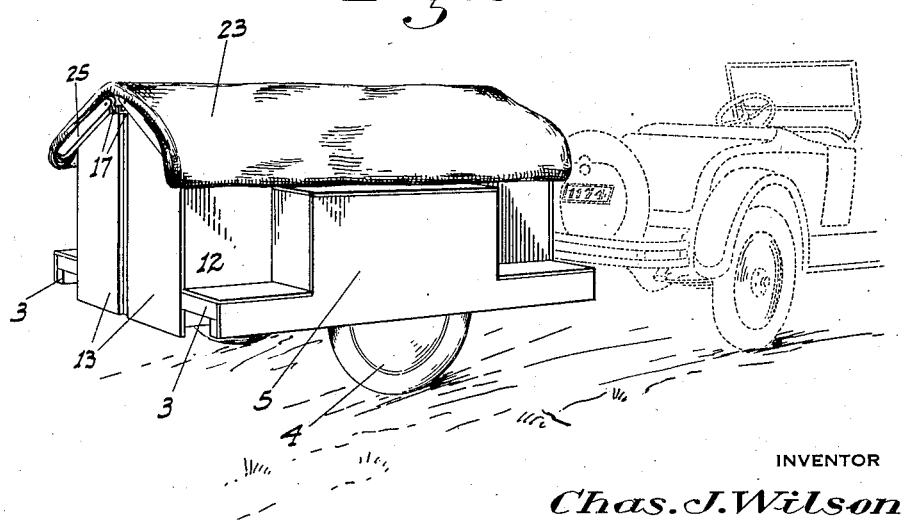
Fig. 3 is a perspective view of my trailer as folded for transportation and connected to a motor vehicle.

The above parts are so disposed that when the wheel trucks are folded and the wheels rest on the ground, the end walls 13 will overlap the ends of the frame 1 and will then be disposed in parallel and slightly separated relation to each other transversely of the structure as shown in Fig. 3.

The mattresses and bedding 15ª of the bunks will then lie in vertical positions close to the adjacent sides of the table cabinet, so that said mattresses are held from dropping down. The roof members 14 then of course face upwardly, as will be evident, and the bunks, cabinets and other features are then completely enclosed and protected. Longitudinal slats 17 are secured to the end walls 13 adjacent the edges of the roof members 14 and extend beyond said end walls. Therefore when these parts are folded the projecting portions of the slats form lugs for the reception of removable locking bolts 18, as shown in Figs. 4 and 5, which prevent undesired unfolding movement of said parts. When the said parts are unfolded so that the wheels will lie parallel to the ground as shown in the right hand portion of Fig. 2, the bunk mattresses will be horizontally disposed and will be ready for occupancy without further adjustment or manipulation being necessary. The innermost edges of the bunks and cabinets 16 are then disposed some distance outwardly of the table and its cabinet, thus providing leg and passage room for those occupying the structure and desiring to use the table. Seat boards 19 may then be removably supported on the horizontal edges of the walls 13, which are then disposed so that said edges are a proper seat height relative to the table and to the floor 6. The rigid table top 8 plus the side leaves 9 if unfolded then form a table of ample width, whose length is equal to the entire length of the trailer, which should be six feet or over so as to provide bunks of proper sleeping length for all average persons. The space between the slats 17 when the wheel trucks are folded is sufficient to receive a ridge pole 20 therebetween, which is removably clamped in place when the bolts 18 are cinched up, and which rests on the shorter end uprights or poles 21, which are then disposed between the bolts 18, and are supported by the folded leaves of the table. This is the transporting position of the pole and uprights. When the parts are unfolded these members are removed and the uprights are placed in a vertical position in the slots 11 and are removably secured in place by bolts 22 or the like. The uprights are provided with a number of bolt holes as shown in Fig. 1 so that said uprights may be adjusted as to height. The ridge pole is then supported from the uprights at the top thereof. A canvas covering 23 is supported by and extends from end to end of the ridge pole and laterally extends to a detachable connection with the outer faces of the roof elements 14. Intermediate the ridge pole and each such roof element the covering passes over a side pole 24 which is secured at its outer ends to arms 25. These arms are pivoted at their opposite ends onto the end walls 13 which, when folded, lie substantially parallel to the roof 14. When said arms are unfolded to thus support the canvas they extend substantially parallel to the roof and project upwardly therefrom so that the said poles are disposed some distance above the bunk structure and thereby hold the adjacent portion of the canvas raised a suitable distance so as not to interfere with the movements of the person occupying the bunk. When the arms have been moved to this position they are prevented from further inward movement, which might be imparted thereto by the pull of the canvas, by the slats 17 which act as stops for the arms. The canvas being secured along the side edges of the unfolded structure, vertical adjustment of the end uprights enables the tautness of the canvas to be altered to suit. End curtain walls 26 provided with one or more windows 27 covered by celluloid, netting, or similar material are suitably attached to the main covering 23 and to the various solid parts of the structure after said main covering is in place. The method of attaching the covering and end curtains is preferably by means of snaps or buttons such as is commonly used for like purposes, and specific illustration and description of such methods and means is therefore deemed unnecessary. The main covering 23 may be permanently secured to the ridge pole so that it will always occupy a proper position relative thereto; and when the trailer is folded and the ridge pole is taken down, the covering is detached from the members 14 and folded under itself the necessary distance, as shown in Fig. 3, thus effectually maintaining a water tight cover over the space between the roof elements 14.

In the type of trailer above described the truck hinge arrangement is disposed along the inner edges of the truck frames, so that when unfolded the outer faces of the wheel housings support the remainder of the structure, and the frame is raised somewhat from the ground, while the portion of the wheels which project outwardly of the housings extend under said frame 1. In this case boxes or blocks, as indicated at 28 in Fig. 2, may be used to support the various parts while the unfolding operations are being carried out, being then removed, so that the wheel housings rest solidly on the ground, the main frame 1 being supported above the ground by the hinged connections with the wheel trucks.

In the hinge arrangement shown in the type of trailer illustrated in Figs. 7 to 10, the hinges 2ª of the truck frames 3ª are disposed along the outer edges of said frames. Therefore when said frames are unfolded the main frame 1ª rests on the ground in common with the wheel housings 5ª. This arrangement has advantages over the first described type, since a firmer support is provided and no blocking up of the structure is necessary. Unless some means is provided for the purpose however the portions of the wheels which are normally clear of the housings will then project over the frame 1ª in the way of the occupants. I have therefore arranged for the wheels to be projected completely into these housings when unfolding operations are being carried out in the following manner:

Each wheel 4ª is supported by a pair of leaf springs 29 which are permanently pivoted at one end onto the truck frame 3ª as at 30. The other ends of the springs are connected to a common shackle 31 which is supported from the frame 3ª by a removable bolt 32. Upon removing this bolt the wheel may be swung on the pivot 30 so as to project entirely into the housing 5ª as shown in dotted lines in Fig. 9; the depth of this housing being sufficient to completely accommodate the wheel. The truck frames may then be swung outwardly and downwardly to their unfolding position as shown in Fig. 8, without the wheels interfering with the main frame or projecting into the path of movement of the occupants of the structure.

In the type of device shown in Figs. 11 to 14, the folding and unfolding operations are arranged to take place with movements in a plane longitudinally instead of transversely of the trailer, as in the first described type.

In this case, the wheel housings 5ᵇ are rigidly mounted at the sides of the main floor-frame 1ᵇ, and the wheels 4ᵇ, while capable of being swung inwardly of their housings, as shown in the type illustrated in Fig. 9, so as to enable the main frame to rest on the ground, always remain in a vertical position.

The folding bed-containing structure 12ª (in which the beds extend transversely of the trailer) are hinged onto the main frame at the ends and lower edges thereof, as shown at 2ᵇ. Thus when the structures are unfolded they rest directly on the ground along with the main frame.

The table 8ª also extends transversely of the trailer and rests on and extends across the top of the wheel housings. The folding leaves of this table are of course hinged along the front and rear edges thereof.

If the wheels are connected in common by an axle, which can be done in this arrangement, a housed-in space is provided under the table to permit of the necessary vertical movement of the axle when the main frame is being lowered to the ground and the trailer is being arranged for use.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described my invention what I claim as new and useful and desire to secure by Letters Patent is:

1. A camping trailer including a horizontal main frame, ground bearing wheels, wheel supporting frames hinged along their lower edges to the sides of the main frame for swinging movement downwardly relative to said main frame from a normal horizontal position so that the wheels will then be disposed substantially parallel to the ground, and bunks mounted on said wheel frames and arranged to be horizontally disposed when said wheel frames are thus swung downwardly.

2. A camping trailer including a horizontal main frame, bunk structures hinged along their lower edges on the frame along the sides thereof and arranged to lie in transversely opposed and adjacent relation on the frame or to be swung outwardly and downwardly away from each other, and wheels mounted directly on said structures and supporting the same and the frame clear of the ground when said structures lie in said opposed relation.

3. A camping trailer including a horizontal main frame, auxiliary frames hinged along their lower edges on the main frame along the sides thereof, walls secured onto said auxiliary frame and forming an enclosure with said main frame when said auxiliary frames are horizontally disposed, and wheels mounted directly on said frames to engage the ground when said auxiliary frames are in such parallel position.

4. A structure as in claim 3, in which housings for the upper portions of the wheels are mounted on the auxiliary frames, the outer faces of said housings being adapted to rest on the ground when the auxiliary frames are swung outwardly and downwardly from a horizontal position.

5. A camping trailer comprising a main horizontal frame, structures hinged on the sides of the frame for folding and unfolding movement relative thereto and when folded forming an enclosure with each other and the main frame above the latter, and wheels directly mounted on and supporting said structures and arranged for engagement with the ground only when the structures are in their folded position.

6. A camping trailer including a horizontal main frame, ground bearing wheels, rectangular housings in which said wheels are mounted and enclosing the upper portions thereof, and means hinging the housings along their outer lower edges to the opposite bottom side edges of the frame whereby when said frames are swung outwardly from a normally vertical to a horizontal position one side of the housings and the bottom of the frame will rest in common horizontal alinement on the ground.

7. A camping trailer including a horizontal main frame, structures hinged along the sides of the frame for folding and unfolding movement relative thereto and when folded forming an enclosure with each other and the main frame above the latter, bunks mounted on said structures and being horizontally disposed when the structures are unfolded and vertically disposed in facing relation to each other when the structures are folded, and a longitudinal cabinet structure mounted on and projecting upwardly from the main frame between said structures; the distance between the opposite side walls of the cabinet being substantially equal to the distance between the bunks when the latter lie in a vertical position whereby to then prevent any loose coverings associated with said bunks from displacement.

In testimony whereof I affix my signature.

CHARLES J. WILSON.